US006081605A

United States Patent [19]

Roth et al.

[11] Patent Number: 6,081,605

[45] Date of Patent: Jun. 27, 2000

[54] CLUTTER REJECTION THROUGH EDGE INTEGRATION

[75] Inventors: Duane Roth; Larry M. Morrison, both of Ridgecrest, Calif.

[73] Assignee: The United States of America as represented by the Secretary of the Navy, Washington, D.C.

[ * ] Notice: This patent is subject to a terminal disclaimer.

[21] Appl. No.: 08/028,013

[22] Filed: Mar. 8, 1993

[51] Int. Cl.[7] .......... G06K 9/00

[52] U.S. Cl. .......... 382/103

[58] Field of Search .......... 382/1, 30, 34, 382/41, 42, 48; 358/105, 107, 108; G06K 9/00, 9/62, 9/68, 9/20, 9/36; H04N 7/00

[56] References Cited

U.S. PATENT DOCUMENTS

| | | | |
|---|---|---|---|
| 5,034,986 | 7/1991 | Karmann et al. | 382/41 |
| 5,109,425 | 4/1992 | Lawton | 382/1 |
| 5,208,872 | 5/1993 | Fisher | 382/42 |
| 5,257,209 | 10/1993 | Markandey | 382/1 |

*Primary Examiner*—Jose L. Couso
*Attorney, Agent, or Firm*—Melvin J. Sliwka; David J. Kalmbaugh; Stephen J. Church

[57] ABSTRACT

A device and method for performing clutter rejection through edge integration. The invention uses optical flow estimation to produce target centering information which is used to control an image source so that a detected moving target is maintained in the center of an image containing the target and accompanying clutter while continuous, real-time integration of the target edges is performed. The output image produced contains an enhanced target and the target to clutter ratio is, therefore, enhanced.

16 Claims, 2 Drawing Sheets

CLUTTER REJECTION THROUGH EDGE INTEGRATION

CLUTTER REJECTION THROUGH EDGE INTEGRATION

CLUTTER REJECTION THROUGH EDGE INTEGRATION

BACKGROUND OF THE INVENTION

1. Field of the Invention

The present invention relates to image processing, and in particular it relates to a method and apparatus for discriminating between a target and clutter in an image.

2. Background

The scenario in which this invention is applicable involves relative motion between target and clutter. Historically, clutter in imagery has caused great difficulty for segmentation processes that are used to differentiate between target and clutter. Clutter, at times, may appear to be very target-like.

There are many different state-of-the-art approaches to discriminate between a target and clutter in an image. One approach is to use a spatial filtering technique. Numerous different pattern recognition approaches may be used to discriminate between target and clutter. Statistical characterizations of the target and clutter have also been used in the discrimination process. There have been processes to increase the signal-to-noise ratio in imagery by integrating successive frames. This integrative process has been shown to work when objects in the image are moving. However, clutter which may obscure a moving target in an image containing both may have considerable body which doesn't appear to move in an image. It could, therefore, integrate up and produce a low target to clutter ratio, i.e. poor discrimination. The problem of integrating moving targets is solved by calculating and correcting for the velocity of the target before integrating. None of these approaches, however, address the problems that are addressed by this invention.

SUMMARY OF THE INVENTION

It is thus an object of the present invention to provide an improved means and method for performing clutter rejection in a moving target image to obtain an improved target to clutter ratio.

It is also another object of the present invention to provide a means for discriminating obscuring clutter from a moving target in an image containing both.

It is further an object of the present invention to apply edge detection and integration techniques to enhancement of moving target discrimination relative to clutter in an image.

It is yet another object of the present invention to provide a means for maintaining target centering in an image during processing for discrimination enhancement relative to clutter in an image.

These and other objects, benefits and advantages of the present invention are provided by the present invention as will be more clearly understood when the disclosure hereinafter is considered in conjunction with the accompanying drawings.

The present invention is a device and methodology for discriminating a moving target in an image from surrounding background and clutter. The invention takes advantage of the fact that the target is moving relative to the background and clutter in which it is immersed.

The invention accepts an input image from a seeker or other image acquisition device. It then detects a target in the image and extracts the edge content of that target. The edges of the target are integrated over time by means of a leaky integrator. Since the target is in motion during the integration, the optical flow of the target is estimated by means of a correlation algorithm and removed from the image. The optical flow information is used to produce target centering information which provides the control feedback to the image acquisition device or image source to maintain real-time target-centering. This continuous target centering in conjunction with the integration performed produces the increased target to clutter ratio.

BRIEF DESCRIPTION OF THE DRAWINGS

In the following detailed description, reference will be made to the accompanying drawings in which.

DETAILED DESCRIPTION OF THE INVENTION

Figure 1:
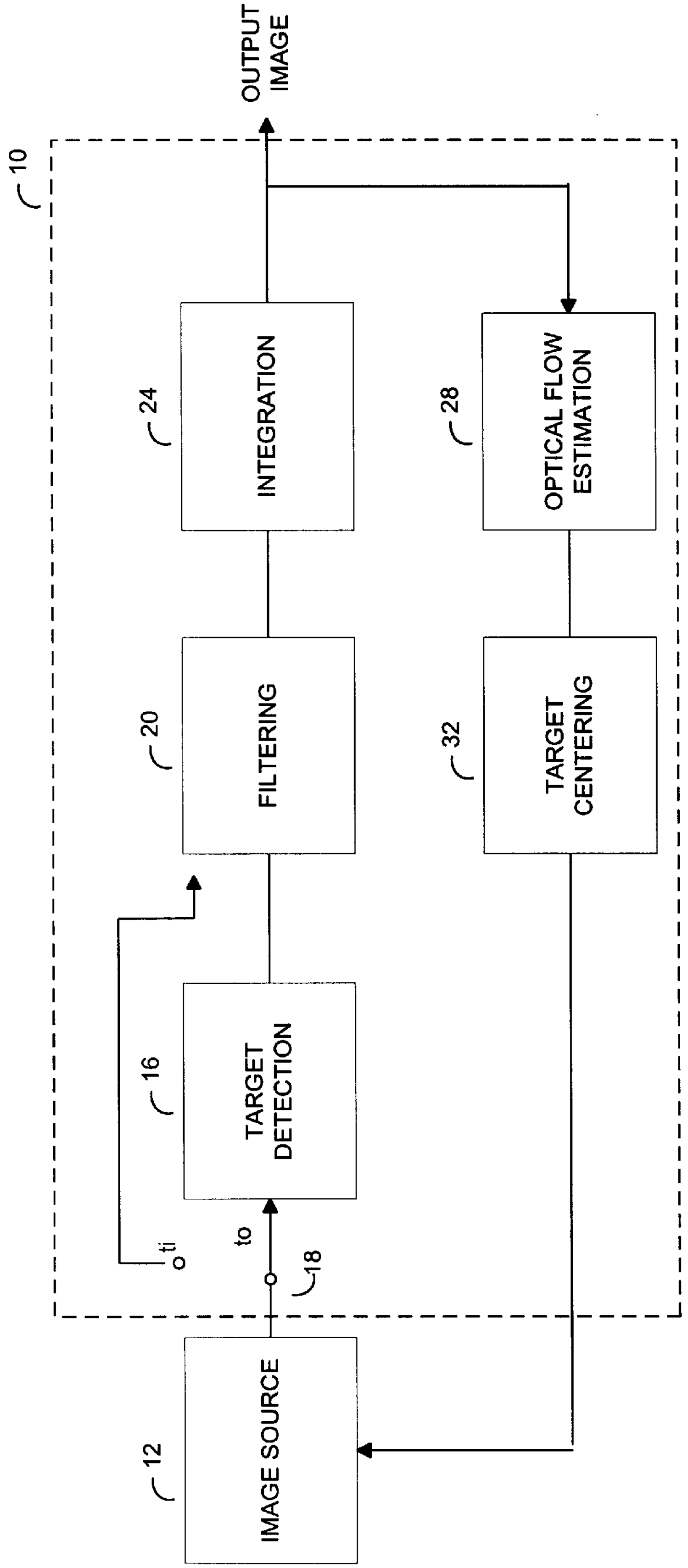
FIG. 1 is a functional block diagram of the present invention.
Figure 2:
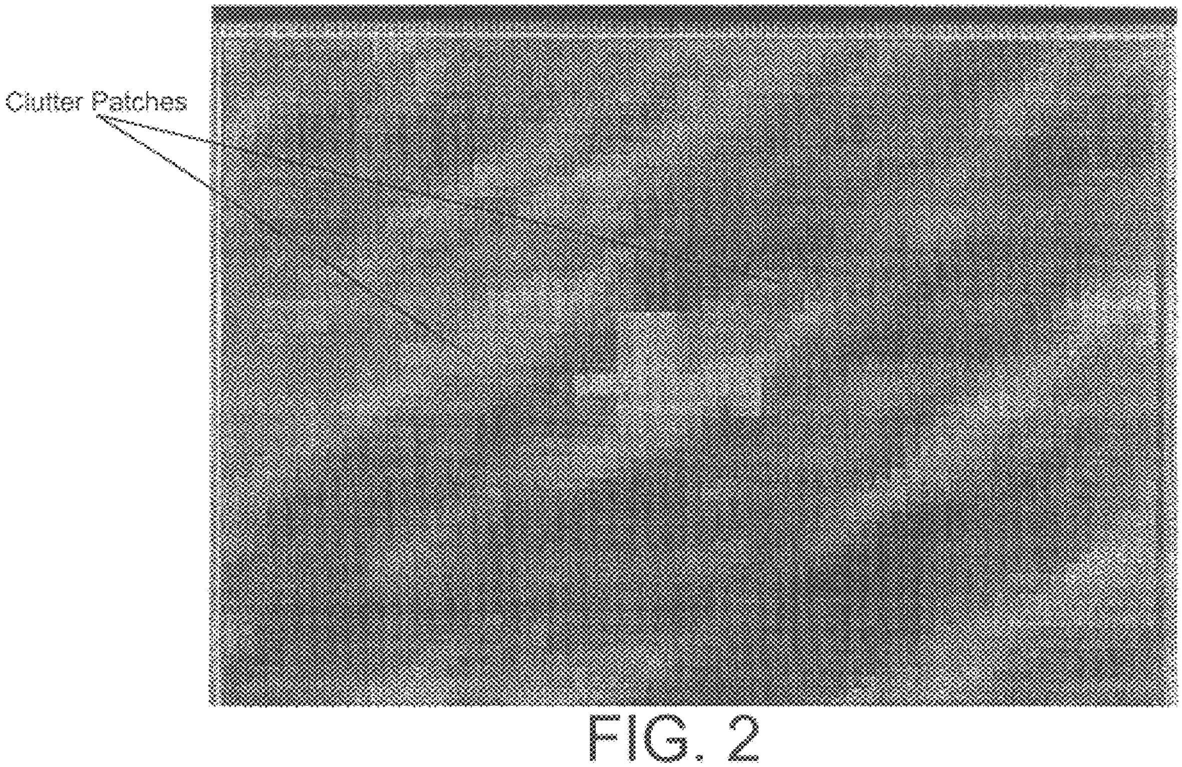
FIG. 2 is a simulated target immersed in clutter.

With reference to FIG. 1, the present invention, the edge integration device 10 for clutter rejection through edge integration and the method of performing same is depicted. The edge integration device 10 may suitably comprise, consist of, or consist essentially of a means for target detection 16, which connects to receive its input from an image source 12 via a switch 18, and which is connected to provide its output to a filtering means 20. The filtering means 20 is connected to the integration means 24 which provides the high target to clutter output image. The output of the integration means 24 is also coupled to the optical flow estimation means 28 which in turn is connected to the target centering means 32. The target centering means connects its output back to the image source 12 to control the source 12 for the purpose of maintaining the target centered in the image continuously and in real-time to enhance the integration process performed by the integrating means 24.

It should be understood that the signals received and produced by the edge integration device 10 could be either analog or digital or both. As already mentioned the image source 12 may be a seeker input. The switch 18 can be any type of switch that can be used to provide an image input at time zero ($t_0$) to the target detection means 16 to initialize the clutter rejection operation of the invention. The switch 18 must then switch to the $t_1$, position in FIG. 1 to connect the image source 12 directly to the filtering means 20 after device initialization and target detection has been accomplished. The filtering means can be any kind of high-pass or band-pass filter dictated by the other means, e.g. digital, analog, etc., selected for implementing the device 10. In a preferred embodiment the target detection means 16 is a spatio-temporal filtering technique, and the filtering means 20 is a Mexican Hat filter. The integration means 24 and the optical flow estimation means 28 again can be analog or digital operations and devices. In a preferred embodiment both were accomplished using a computer and software subroutines to perform the necessary operations digitally. The target centering means 32 is, of course selected to utilize an input from the optical flow estimation means 28 and provide a control signal output to the image source 12 to maintain target centering in the image being processed.

Operation

In operation, with reference to FIG. 1, the image source 12, a seeker for example, produces an image of a target and background including clutter in which the target may be immersed. A simulation of such an image is depicted in FIG.

2 where a moving target appears centered in a background including clutter patches which almost obscure the target.

The image produced by the image source 12 is input to the target detection means 16, in a preferred embodiment, via the switching means 18. The switching means 18 directly connects the image source 12 to the target detection means 16 at time zero $t_0$ to initialize the device 10. Initialization permits the moving target to be detected using a spatio-temporal filtering process in a preferred embodiment, in the first instance, so that thereafter it can be continuously enhanced and tracked by the device 10. The spatio-temporal filtering consists essentially of first performing a Gaussian filtering operation on the current image and doing likewise on a delayed version of the image. The current, filtered image is then subtracted from the delayed filtered image. A paper entitled "A Retina-like model for Motion Detection," by F. H. Eckman and T. S. Axebrod, of Lawrence Livermore National Laboratory, Livermore, Calif. discusses such a detection technique. The output of the target detection means provides target location and velocity information. After initialization, the switch 18 closes to the time one ($t_1$) position which bypasses the target detection means 16 and connects the image source 12 directly to the filtering means 20.

The filtering means 20 performs a bandpass filtering operation employing a well known kernel commonly known as the "Mexican Hat". The "Mexican Hat" kernel is formed by subtracting a Gaussian kernel with broad support from a Gaussian kernel with narrow support. A 3×3 size kernel was used in a large tracking application.

The output of the filtering means 20 is provided as the input to the integration means 24. The integration means 24 performs integration on the input using several stages of an integrator of the form:

$$y[n]=A*y[n-1]+B*x[n]$$

where, y[n]=the out signal.

x[n]=the input signal.

Figure 3:
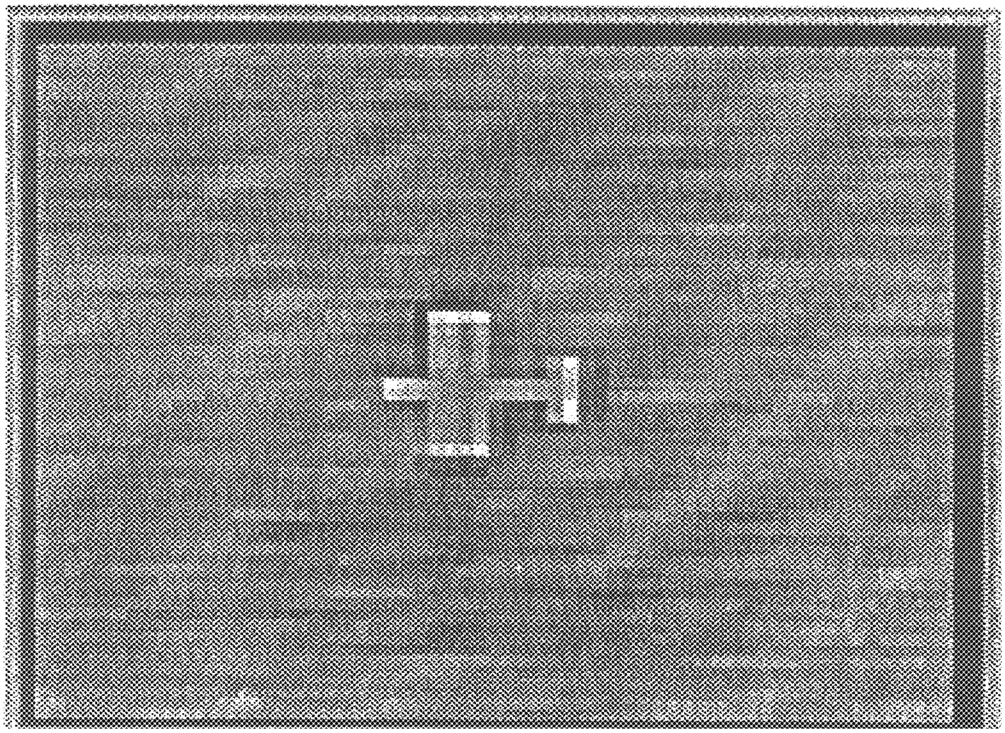
FIG. 3 is the simulated target of FIG. 2 after processing by the present invention.

A and B are parameters to be chosen.

where the parameters A and B were chosen to sum to 1.0 and where A=0.9+/−0.1 and B=0.1+/−0.1. The above integrator is known to those skilled in the art as a "leaky" integrator. It permits the invention to integrate the target up and the clutter down. In a preferred embodiment the integration means was performed digitally using a computer sub-routine integration algorithm. The output of the integration means 24 is the output image with the target enhanced and the clutter substantially reduced as shown in FIG. 3. This output is also introduced into the feedback loop comprising the optical flow estimation means 28 and the target centering means 32. The optical flow of the target requires the preparation of a template by the optical flow estimation means 28 for correlation with successive images of the target. The template is calculated by first segmenting the image. The template size (patch) selected with the greatest amount of energy is chosen to be the template for correlation. It should be understood that template size can be changed periodically or only when target appearance, e.g. aspect, changes. The optical flow is given by the point at which there is maximum correlation with the template in accordance with:

$$O(i,j)=\sum_{m=1}^{M}\sum_{n=1}^{N}T(m,n)*I(i+m-1,\ j=n-1)$$

where,

O(i,j)=the result of the correlation.

T(m,n)=the target template.

I(i,j)=the input image patch.

i and j are the image indexes.

m and n are the template indexes;

M Horizontal diminsion of window in pixels

N Vertical dimension of window in pixels

In a preferred embodiment the optical flow estimation means was a computer subroutine mechanizing the above relationship. It could have alternatively been an electronic or electromechanical mechanization.

The continuing correlation output of the optical flow estimation means 28 is input to the target centering means 32 which provides the feedback to control the image sources.g. seeker, focal plane array, etc., to keep the target initially detected by the target detection means 16 centered in the image continuously to permit the continuous integration performed by integration means 24 enhancing and bringing the target contribution to the image up while diminishing the clutter contribution to the image. The present invention thus picks off the target in an input image in such a way that it can be continuously maintained centered in the image while background moves relative to it so that a continuous "leaky" integration process can be applied to it to produce a large target to clutter ratio. The present invention thus enhances the target relative to the clutter in the image and avoids the problems that occur when clutter which has considerable body and doesn't appear to move in an image causes the clutter to be integrated up, producing a lower target to clutter ratio.

In summary the method of image processing of the present invention for discriminating a moving target from clutter in the image at any point in time requires performance of the following steps:

1. detecting a moving target in an input image in conjunction with a target centering input;
2. extracting the edge content of said target;
3. integrating the extracted edges of said image over time and providing an output image;
4. estimating the optical flow of said target; and
5. producing a target centering input from said optical flow information for said detection step.

The structures and methods disclosed herein illustrate the principles of the present invention. The invention may be embodied in other specific forms without departing from its spirit or essential characteristics. The embodiments of the invention described herein are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What we now claim as our invention is:

1. an image processing device for discriminating a target from clutter in an image containing a moving target, said device comprising:

a means for detecting a moving target in an image input, said means additionally having a target centering input;

a means, connected to said detecting means, for extracting the edge content of said target;

a means, connected to said edge extracting means for integrating the extracted edges of said image over time to reject clutter, said integrating means providing an output image;

a means, connected to said integrating means, for estimating the optical flow of said target; and a means, connected to receive as an input the output of said estimating means and having its output connected as an input to said detection means, for centering the target in said image to permit the integrating means to increase the target to clutter ratio.

2. The image processing device of claim 1 wherein said means for detecting a moving target in an image input is a spatio-temporal filter.

3. The image processing device of claim 2 wherein said spatio-temporal filter, comprises:

means for Gaussian filtering a current image input;

means for Gaussian filtering a delayed version of said current image input; and means for subtracting the current filtered image from the delayed filtered image.

4. The image processing device of claim 1 wherein said means for extracting the edge content of said target is a two-dimensional bandpass filter.

5. The device of claim 4 wherein said two-dimensional bandpass filter, comprises:

a means for producing a Gaussian kernel with broad support;

a means for producing a Gaussian kernel with narrow support; and a means for subtracting said broad support Gaussian kernel from said narrow support Gaussian kernel.

6. The image processing device of claim 1 wherein said means for integrating the edges of the image over time is a leaky integrator performing clutter rejection and is of the following form:

$$y[n]=A*y[n-1]+B*x[n]$$

where, y[n]=the out signal;

x[n]=the input signal;

A and B are parameters to be chosen.

7. The device of claim 6 wherein A and B are chosen to sum to 1.0.

8. The image processing device of claim 1 wherein said means for estimating the optical flow of the target, comprises:

means for calculating and storing a target template containing the greatest amount of energy;

means for correlating the calculated template with each successive image in accordance with $$O(i, j) = \sum_{m=1}^{M} \sum_{n=1}^{N} T(m, n) * I(i + m - 1, j = n - 1)$$

where,

O(i,j)=the result of the correlation;

T(m,n)=the target template;

I(i,j)=the input image patch;

i and j are the image indexes;

m and n are the template indexes;

M Horizontal diminsion of window in pixels

N Vertical dimension of window in pixels means for identifying the maximum correlation point for the template in use, said maximum point defining optical flow; and means for periodically recalculating the template to reflect changes in the target shape.

9. The image processing device of claim 1 wherein said means for centering the target in the image to permit the integrating means to increase the target to clutter ratio is a feedback device to control the image source selected from the group consisting of a seeker and a focal plane array, so that the target initially detected by said target detection means is centered in the image continuously to permit continuous integration by said integration means.

10. The method of image processing for discriminating a target from clutter in an image containing a moving target, comprising the steps of:

a) detecting a moving target in an input image in conjunction with a target centering input;

b) extracting the edge content of said target;

c) integrating the extracted edges of said image over time to reject clutter and providing an output image;

d) estimating the optical flow of said target; and e) producing a target centering input from said optical flow information for said detection step.

11. The method of claim 10 wherein said detecting step includes spatio-temporal filtering.

12. The method of claim 11 wherein said spatio-temporal filtering includes the steps of:

a) Gaussian filtering a current image input;

b) Gaussian filtering a delayed version of said current image input; and c) subtracting the current filtered image from the delayed filtered image.

13. The method of claim 10 wherein said extracting step comprises the steps of:

a) producing a Gaussian kernel with broad support;

b) producing a Gaussian kernel with narrow support; and c) subtracting said broad support Gaussian kernel from said narrow support Gaussian kernel.

14. The method of claim 10 wherein said integrating step comprises performance of leaky integration for clutter rejection and is of the form:

$$y[n]=A*y[n-1]+B*x[n]$$

where, y[n]=the out signal;

x[n]=the input signal;

A and B are parameters to be chosen.

15. The method of claim 14 wherein parameters A and B are chosen to sum to 1.0.

16. The method of claim 10 wherein the step of estimating the optical flow of the target, comprises the steps of:

a) segmenting the image;

b) choosing the segment with the greatest amount of energy to be a target template;

c) calculating and storing said target template;

d) correlate the calculated template with each successive image in accordance with $$O(i, j) = \sum_{m=1}^{M} \sum_{n=1}^{N} T(m, n) * I(i + m - 1, j = n - 1)$$

where,

O(i,j)=the result of the correlation;

T(m,n)=the target template;

I(i,j)=the input image patch;

i and j are the image indexes;

m and n are the template indexes;

M Horizontal diminsion of window in pixels

N Vertical dimension of window in pixels e) identify the maximum correlation point for the template in use, said maximum point defining optical flow; and f) periodically recalculating the template to reflect changes in the target shape.

* * * * *